United States Patent
Hamasaki et al.

(10) Patent No.: US 7,300,213 B2
(45) Date of Patent: Nov. 27, 2007

(54) MEMBER HOLDING OPTICAL TRANSMISSION LINE AND OPTICAL MODULE

(75) Inventors: Hiroshi Hamasaki, Hiratsuka (JP); Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/472,367

(22) Filed: Jun. 22, 2006

(65) Prior Publication Data

US 2006/0291783 A1    Dec. 28, 2006

(30) Foreign Application Priority Data

Jun. 24, 2005   (JP) ............... 2005-185106

(51) Int. Cl.
G02B 6/36    (2006.01)
(52) U.S. Cl. ............. 385/88; 385/14; 385/92; 385/49
(58) Field of Classification Search .......... 385/24, 385/14, 88, 89, 90, 92, 93, 348, 49, 38
See application file for complete search history.

(56) References Cited

U.S. PATENT DOCUMENTS

| | | | | |
|---|---|---|---|---|
| 4,611,884 A | * | 9/1986 | Roberts | 385/44 |
| 4,732,446 A | * | 3/1988 | Gipson et al. | 385/24 |
| 4,897,711 A | * | 1/1990 | Blonder et al. | 257/48 |
| 6,834,133 B1 | * | 12/2004 | Towle et al. | 385/14 |
| 6,931,181 B2 | * | 8/2005 | Jewell et al. | 385/49 |
| 2005/0013542 A1 | * | 1/2005 | Blasingame et al. | 385/38 |
| 2005/0063651 A1 | | 3/2005 | Hamasaki et al. | 385/100 |
| 2005/0141824 A1 | | 6/2005 | Furuyama et al. | 385/89 |
| 2005/0169596 A1 | | 8/2005 | Hamasaki et al. | 385/137 |
| 2005/0230795 A1 | | 10/2005 | Furuyama et al. | 257/678 |
| 2006/0039658 A1 | | 2/2006 | Furuyama et al. | 385/90 |
| 2006/0045434 A1 | | 3/2006 | Numata et al. | 385/88 |

FOREIGN PATENT DOCUMENTS

| | | |
|---|---|---|
| JP | 2000-347072 | 12/2000 |
| JP | 2001-159724 | 6/2001 |

* cited by examiner

*Primary Examiner*—Brian M. Healy
(74) *Attorney, Agent, or Firm*—Oblon, Spivak, McClelland, Maier & Neustadt, P.C.

(57) ABSTRACT

In an optical module, a member has a hole and a mounting surface in which the hole is open and electric wiring is formed. A recess is formed in the mounting surface. The electric wiring is formed in the recess and is continuously extended to an outside the recess. The electric wiring is provided with a connecting portion on a bottom surface of the recess. An optical transmission line is inserted into the hole and its optical input or optical output end is faced to the optical semiconductor device so as to be optically coupled to the optical transmission line. The semiconductor device is mounted on the mounting surface and electrically connected to the connecting portion. The gap between the optical semiconductor device and the opening end face of the optical transmission line is filled with an adhesive.

15 Claims, 5 Drawing Sheets

MEMBER HOLDING OPTICAL TRANSMISSION LINE AND OPTICAL MODULE

CROSS-REFERENCE TO RELATED APPLICATIONS

This application is based upon and claims the benefit of priority from prior Japanese Patent Application No. 2005-185106, filed Jun. 24, 2005, the entire contents of which are incorporated herein by reference.

BACKGROUND OF THE INVENTION

1. Field of the Invention

The present invention relates to an optical semiconductor device for use in optical communication and transmission techniques and the like, and in particular, to a member holding an optical transmission line and an optical module both of which have an improved wiring part.

2. Description of the Related Art

A technique has recently been researched and developed which uses a coupling scheme called direct optical coupling (i.e., butt joint) to reduce an implementation cost; this technique arranges an optical semiconductor device such as a light emitting element or a an optical sensing element and an optical fiber opposite each other and immediately close to each other to achieve optical coupling without using any lenses.

With the direct optical coupling, a light beam emitted from the semiconductor device or optical fiber is transmitted through a medium and diverged in the medium, the medium having a substantially equal refractive index and having no waveguide mechanisms, for example, air or a refractive index matching material, unless the medium is provided with any lens effect. This increases the light rays of the beam, which are incident in area or areas other than the wave-guiding portion (core) of the optical fiber or an active area (optical sensing area) of the optical sensing element. This in turn reduces light coupling efficiency and thus noise resistance, while increasing the amount of stray light rays. As a result, the amount of another noise (for example, crosstalk noise) increases to affect signal transmissions.

It is thus important to arrange the optical semiconductor device and the optical fiber as close to each other as possible to prevent light rays from reaching unwanted area or areas. For example, a light beam emitted from a multimode optical fiber with a numerical aperture (NA) of 0.21 and a core diameter of 50 µm is diverged in the air at a spread angle of about 12°. The optical semiconductor device and the optical fiber thus need to be arranged closer to each other so that the distance between them is about several tens of µm. Moreover, standard optical fibers need to have a radius of curvature of about 30 mm and cannot be bent at a right angle. The optical fiber is consequently placed in a surface having an axial direction substantially parallel to a surface on which an optical module is mounted. The optical fiber in the optical module therefore needs to avoid projecting in a direction perpendicular to a substrate on which it is mounted, to reduce the thickness of the entire apparatus.

To meet these various requirements, Jpn. Pat. Appln. KOKAI Publication No. 2000-34072 proposes an optical module provided with a member holding an optical transmission line, which has a holding hole in which an optical fiber is inserted to hold the optical fiber. Thus, the optical fiber is held in the holding hole, and an optical semiconductor device is mounted on a surface of the member, on which the holding hole is open.

However, the optical module proposed in Jpn. Pat. Appln. KOKAI Publication No. 2000-34072 poses problems described below. In this conventional optical module, the member holding the optical transmission line has a surface in which an optical input port or an optical output port of the optical transmission line is located. An electrode is also provided on this surface and the optical semiconductor device is mounted on the electrode. In the optical module configured as described above, the member holding the optical transmission line has a thermal expansion coefficient different from that of the optical semiconductor device. Consequently, a heat cycle, a thermal impact, or the like concentrates stress on the electric connection between the member and the optical semiconductor device. Metal fatigue is thus likely to occur to destroy the module. Consequently, an underfill material (adhesive) consisting of resin or the like needs to be filled between the optical semiconductor device and the surface of the optical transmission line holding member on which the optical semiconductor device is mounted. This reduces the stress concentrated on the electric connection to improve the reliability of the module.

In this optical module, the optical input portion or the optical output portion of the optical semiconductor device is preferably placed in proximity to the optical input port or the optical output port of the optical transmission line. Further, the gap into which the underfill material is filled is very narrow; its width is set at, for example, 5 to 50 µm. The resin as the underfill material thus needs to be less viscous. After being completed, the optical module is electrically connected to an external mounting substrate or an IC. In this optical module, if the underfill material is less viscous, the resin may travel along the electrode to contaminate its connecting point. In particular, a module that needs to exhibit a high frequency characteristic is likely to be contaminated because it needs to have as small an electrode length as possible.

BRIEF SUMMARY OF THE INVENTION

According to an aspect of the present invention, there is provided an optical module comprising:

an optical transmission line having an end face;

a member configured to hold the optical transmission line, the member having a through hole into which the optical transmission line is inserted, a mounting surface and a recess formed in the mounting surface as to have a bottom surface in which the through hole is open;

electric wirings having connecting portions, which are formed in the recess and are extended to the outside of the recess;

an optical semiconductor device so arranged in the recess as to be optically coupled with the end face of the optical transmission line with a gap maintained between the optical semiconductor device and the end face, and electrically connected to the connecting portions; and an adhesive applied to the recess so that the gap is filled with the adhesive.

According to a second aspect of the present invention, there is provided a holding member comprising:

a body having a through hole in which an optical transmission line is to be inserted, a mounting surface and a recess formed in the mounting surface, the recess having a bottom surface in which the through hole is open and in which an optical semiconductor device is to be arranged in such a manner that the optical semiconductor device is optically coupled with the end face of the optical transmission line with a gap maintained between the optical semiconductor device and the end face; and electric wirings having connecting portions to be connected to the optical semiconductor device, the electric wirings being formed in the recess and extended to the outside of the recess.

DETAILED DESCRIPTION OF THE INVENTION

There will be described a member holding an optical transmission line and an optical module according to an embodiment of the present invention with reference to the drawings.

FIRST EMBODIMENT

Figure 1:
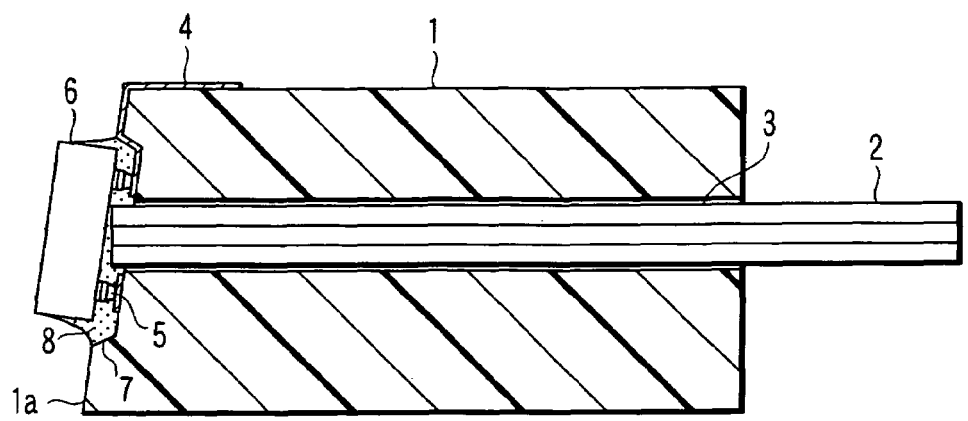
FIG. 1 is a sectional view schematically showing an optical module according to an embodiment of the present invention.

FIG. 1 is a sectional view schematically showing an optical module according to a first embodiment of the present invention.

In FIG. 1, reference numeral 1 denotes a member holding an optical transmission line or optical guide 2. The holding member 1 has a through hole 3 in which the optical transmission line 2 such as an optical fiber or an optical waveguide is held. The holding member 1 is made of an epoxy resin, a polyphenylenesulfide (PPS) resin, polybutyleneterephthalate (PBT) resin, a phenol resin, a polyester resin, a polyimide resin, a fluorine resin, or the like. In particular, the holding member 1 is suitably made of an epoxy resin or a PPS resin into which about 80% of glass filler of size 5 to 30 μm is mixed. This enables the holding member 1 to be easily formed by resin molding using a mold.

The holding hole 3 penetrates the holding member 1 with openings formed on the opposite sides of the holding member 1. An optical input end face or an optical output end face of the optical transmission line 2 projects from one of the openings. The optical transmission line 2 is extended from the other opening. The optical input or optical output end face of the optical transmission line 2 corresponds to a substantially vertical end face formed by stress rupture. This enables a reduction in manufacture cost compared to an end face formed by polishing or the like.

Electric wiring 4 is formed by plating or embedded lead frame on a surface 1a on which an optical semiconductor device is mounted and in which the holding hole 3 is opened. The electric wiring 4 extends onto another surface adjacent to the mounting surface 1a, for example, a top surface of the optical module as shown in FIG. 1. The electric wiring 4 is connected, by bumps 5, to an optical semiconductor device 6 such as a surface emitting laser or a surface type optical sensing element. An optical input or optical output portion of the optical semiconductor device 6 is placed substantially opposite the optical input or optical output end face of the optical transmission line 2. This allows the optical semiconductor device 6 to be optically coupled to the optical transmission line 2. That is, the optical semiconductor device 6 is substantially directly coupled to the optical transmission line 2. In this structure, a normal direction of the mounting surface is inclined to an axial direction of the through hole. Thus, the normal of the mounting surface 1a is preferably inclined the normal of the mounting surface 1a is preferably inclined at, for example, 4 to 10° to the axial direction of the optical transmission line 2. The mounting surface 1a is not parallel to but is slightly inclined to the optical input or optical output end face of the optical transmission line 2. A light beam is thus reflected by the end face of the optical fiber, which serves as the optical transmission line 2. This prevents the light beam from reentering the optical input or optical output portion of the optical semiconductor device 6. As a result, optical noise can be suppressed.

A recess 7 is formed in the mounting surface 1a. A connecting portion is provided on a bottom surface of the recess 7 to electrically connect the optical semiconductor device 6 and the bumps 5 together. Consequently, the electric wiring 4 extends from the bottom surface of the recess 7 along a slope of the recess 7 and the mounting surface 1a onto another surface. The recess 7 is applied with an underfill material (adhesive) 8 such as an epoxy resin or a silicone resin or up to a predetermined height from the bottom surface. Preferably, the recess 7 may be entirely filled with an underfill material 8. The underfill material 8 enables a reduction in stress resulting from the difference in thermal expansion coefficient between the optical semiconductor device 6 and the optical transmission line holding member 1. This enables the suppression of rupture of the electric connecting portion caused by metal fatigue or the like.

The underfill material 8 is desirably filled between the optical input or optical output portion of the optical semiconductor device 6 and the optical input or optical output end face of the optical transmission line 2. In this case, the underfill material 8 is desirably transparent at the operating wavelength of the optical semiconductor device 6. By providing the underfill material 8 with a refractive index equal to the equivalent refractive index of core of the optical transmission line 2, for example, a refractive index of 1.4 to 1.6, it is possible to reduce the Fresnel reflection of light rays by the ends face of the optical transmission line. This enables a reduction in reflected light noise in the entire system.

The underfill material 8 needs to sufficiently fill a very small area such as spaces between the surface of the optical semiconductor device 6 and the optical input or optical output end face of the optical transmission line 2 and around the bumps. For example, if the connecting portion is a stud bump composed of an Au wire, the connected bump has a height of about 40 to 50 μm. The underfill material 8 used for filling has a lower viscosity and is relatively readily wettable. Owing to its wettability and flowability based on a capillary phenomenon, the underfill material 8 spreads readily in a flat area. Moreover, the underfill material 8 tends to spread even in a small area such as an edge of electrode metal because of the capillary phenomenon.

To prevent the underfill material 8 from flowing to an unwanted area, a step such as the recess 7 is formed on the mounting surface 1a. This makes it possible to stop the underfill material 8 from flowing through a given area in which surface tension does not work. This structure makes it possible to prevent resin from flowing out to the area to which the electric wiring 4 is drawn out. This in turn enables a proper connecting portion free from unwanted resin to be formed before an electric connection to an external device. In particular, if a high-frequency signal is supplied to the electrode, the electrode is set to have a minimized length, thus reducing the length over which the electrode is drawn out of the optical semiconductor device 6. This may cause the resin to flow along the electrode even to its connecting point. However, the recess 7, formed in the mounting surface 1a, prevents the resin from flowing out.

The optical semiconductor device mounting surface 1a is inclined to the axis of the optical transmission line 2 in order to suppress the adverse effect of reflected light beams. In this case, a larger inclination more effectively prevents reflection but may result in a more obtuse angle at the boundary edge between another side surface to which the electrode is drawn out and the mounting surface. This causes the resin to flow out readily. However, the recess 7, formed in the mounting surface 1a, can more reliably prevent the resin from flowing out.

Figure 2:
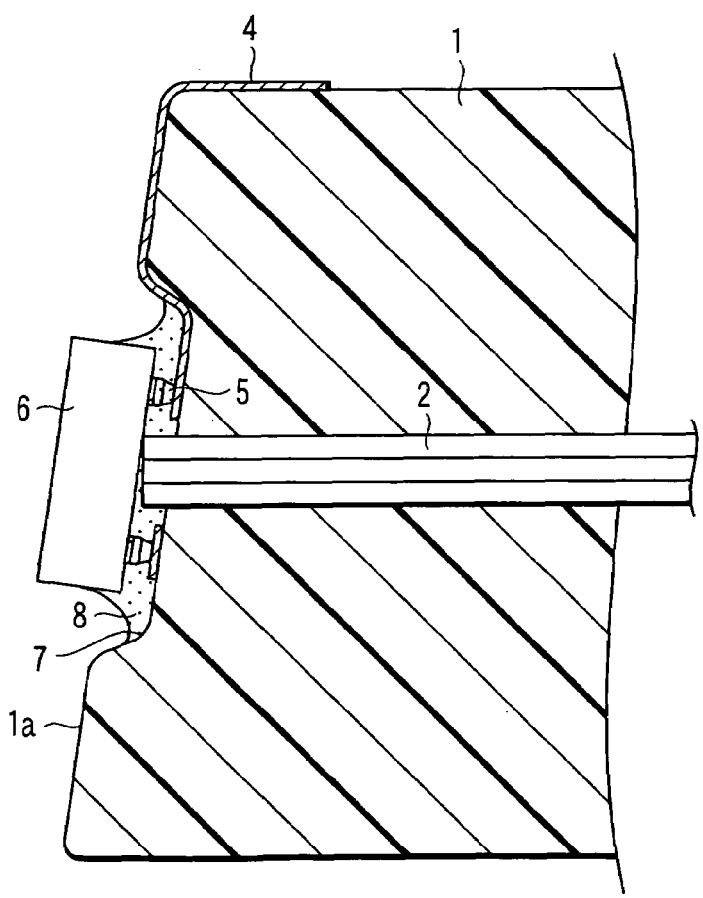
FIG. 2 is a partly enlarged sectional view showing a part of the optical module shown in FIG. 1 in which an optical semiconductor device is mounted.
Figure 3:
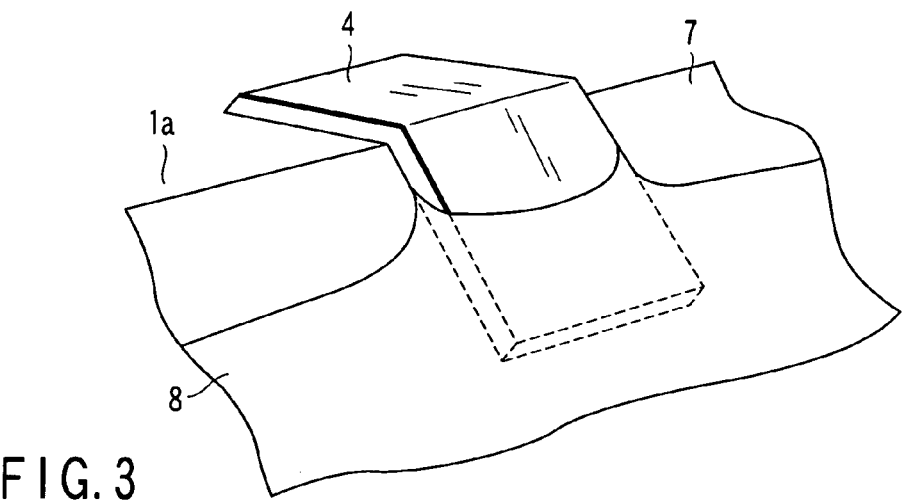
FIG. 3 is a perspective view illustrating an electric wiring portion of the optical module shown in FIG. 1.

FIG. 2 is a sectional view showing, in detail, the structure of the area in which the optical semiconductor device 6 is mounted. Sharp edges are not precisely formed at the boundaries between the recess 7 and the surface 1a and between the optical semiconductor device mounting surface 1a and a different surface; the boundaries are provided with small curvatures. This prevents the surface tension from discontinuing but causes it to vary gradually. Consequently, well-defined flowout preventing boundary lines are unlikely to be formed. Certain damage or a variation in shape may cause the resin to flow out over the boundary lines. Further, as shown in FIG. 3, the capillary phenomenon is prone to occur at the edge of plating metal of the electric wiring 4. If the electrode is drawn out from the bottom surface of the recess 7 along the slope to the exterior, the resin is particularly likely to flow over the boundary lines.

However, even with the structure shown in FIGS. 2 and 3, the probability of flowout over the boundary lines can be reduced by filling the resin up to the given height from the bottom surface of the recess 7, that is, to the extent that the resin does not flow over the slope of the recess 7. The filling height can be controlled on the basis of the amount of resin filled. However, even with a more or less increase in the amount of resin filled, the presence of the recess 7 enables a sufficient amount of resin for underfilling to be filled. This is because a similar flowout preventing effect can be exerted by filling the resin to the extent that the resin does not flow over the boundary of the recess 7.

Figure 4A:
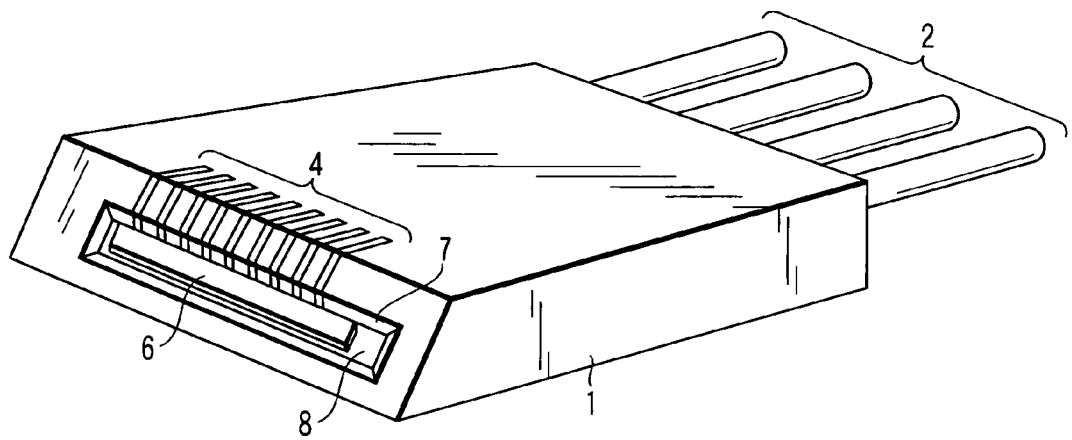
FIGS. 4A and 4B are perspective views schematically showing an optical module having a plurality of optical fibers according to a variation of the optical module shown in FIG. 1.
Figure 4B:
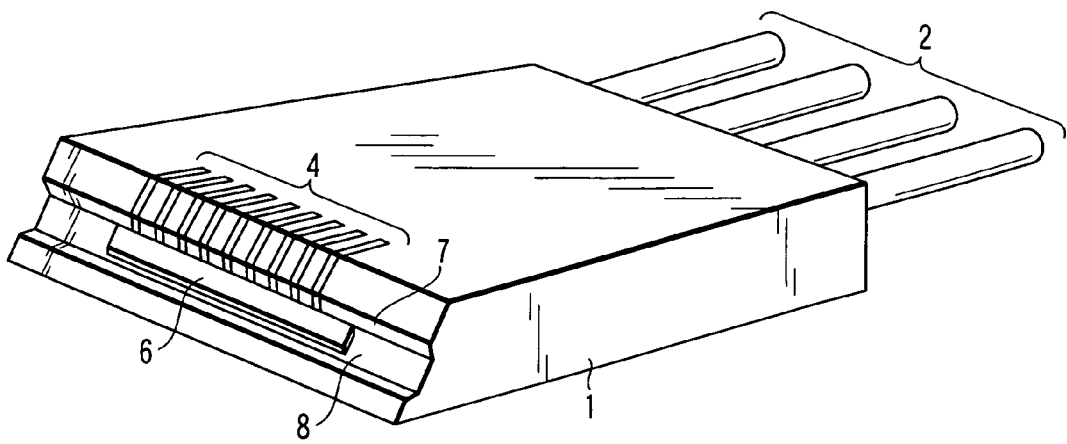

FIGS. 4A and 4B are perspective views showing an example of configuration of an optical module having a plurality of fibers as the optical transmission lines 2. Four optical fibers are shown as the optical transmission lines, but the number of optical fibers is not limited particularly limited. In the optical module shown in FIG. 4A, an elongated semiconductor apparatus in which a plurality of optical semiconductor elements 6 is formed in an array is received in the recess 7 so as to be continuously extended in the recess 7. It is desirable that the recess 7 is formed in association with the elongated semiconductor apparatus so that the underfill material 8 can be filled at a time, as shown in FIG. 4A. In the optical module shown in FIG. 4A, the holding member 1 is provided with the elongated recess 7 surrounded by the continuous surface portion. However, the elongated recess 7 may be formed as a trench or groove extending along the surface of the holding member 1, as shown in FIG. 4B. In this structure as shown in FIG. 4B, the semiconductor apparatus 6 is also received in the trench or groove and the underfill material 8 is poured in the trench or groove so as to fill the material 8 in the gap between the apparatus 6 and the end face of the fibers 2.

Figure 5:
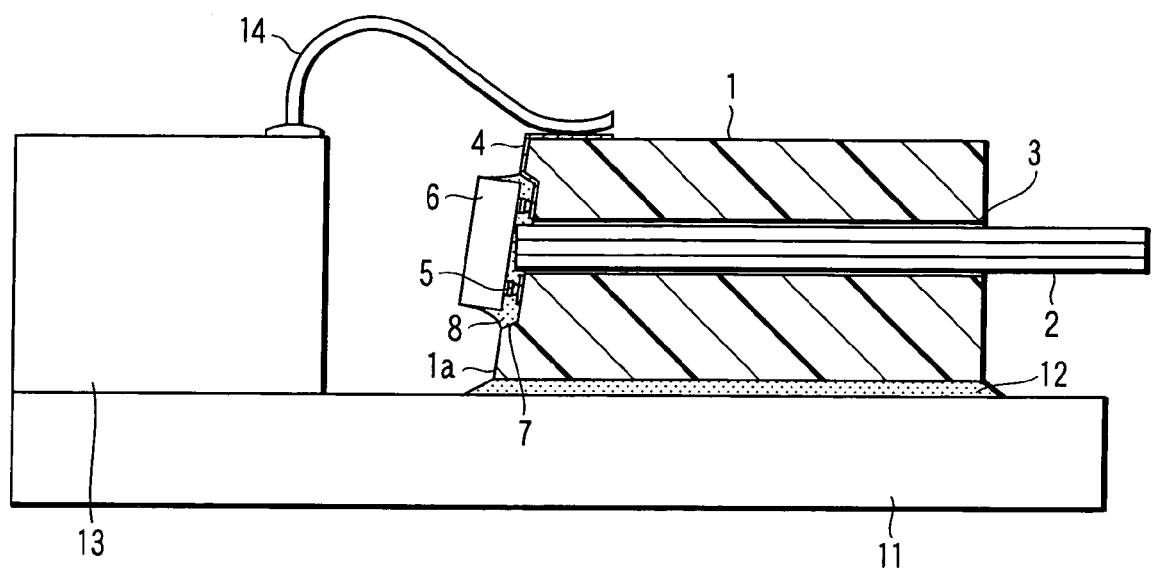
FIG. 5 is a partial sectional view schematically showing how the optical module shown in FIG. 1 is mounted on a mounting substrate.

FIG. 5 is a sectional view showing how the optical module shown in FIG. 1 or 4 is mounted on a mounting substrate.

As shown in FIG. 5, a bottom surface of the holding member 1 is fixed to a top surface of the mounting substrate 11 by an adhesive 12, wherein the bottom surface is almost parallel to the optical axis of the optical transmission line 2. An IC 13 is mounted on the mounting substrate 11 and connected to the electric wiring 4 via an Au wire 14.

Thus, in the optical module, a surface tension discontinuous area is formed at the boundary of the recess by providing a recess 7 in the device mounting surface 1a of the holding member 1. This enables the underfill material 8 filled between the optical semiconductor device 6 and the holding member 1 to remain in the recess 7. Thus, for example, the underfill material 8 can be prevented from disadvantageously flowing onto the electric wiring 4 to contaminate the electric connecting point. This makes it possible to improve the reliability of the optical semiconductor device.

By slightly inclining the device mounting surface 1a of the optical transmission line holding member 1 to the axis of the optical transmission line 2, it is possible to reduce the adverse effect of reflected light rays on the optical input or optical output portion of the optical semiconductor device 6 and on the optical input or optical output end face of the optical transmission line 2.

SECOND EMBODIMENT

Figure 6:
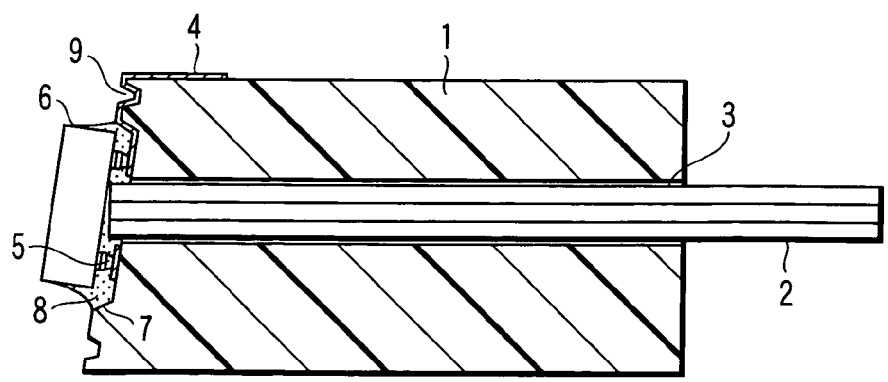
FIG. 6 is a sectional view schematically showing an optical module according to a second embodiment of the present invention.

FIG. 6 is a sectional view showing the configuration of an optical module according to a second embodiment of the present invention. The same parts as those shown in FIG. 1 are denoted by the same reference numerals and their detailed description is omitted.

In the optical module shown in FIG. 6, unlike the previously described optical module according to the first embodiment, not only the recess 7 but also another recess 9 are formed in the device mounting surface 1a. That is to say, the groove-shaped recess 9 is formed in the device mounting surface 1a outside the recess 7. The recess 9 may be formed annularly so as to surround the recess 7.

This structure not only produces effects similar to those of the first embodiment but also provides more surface tension discontinuous parts on the device mounting surface 1a. The structure thus exerts a higher flowout preventing effect.

Specifically, even if a certain variation in shape or surface condition causes the resin to flow out from the recess 7, the recess 9 functions as a second barrier. This makes it possible to drastically reduce a percent defective resulting from the flowout.

(Variations)

The present invention is not limited to the above embodiments. In the above optical modules, the electric wiring is drawn out only to the particular surface. However, the electric wiring may be drawn out to two or more surfaces instead of the single surface.

Figure 7:
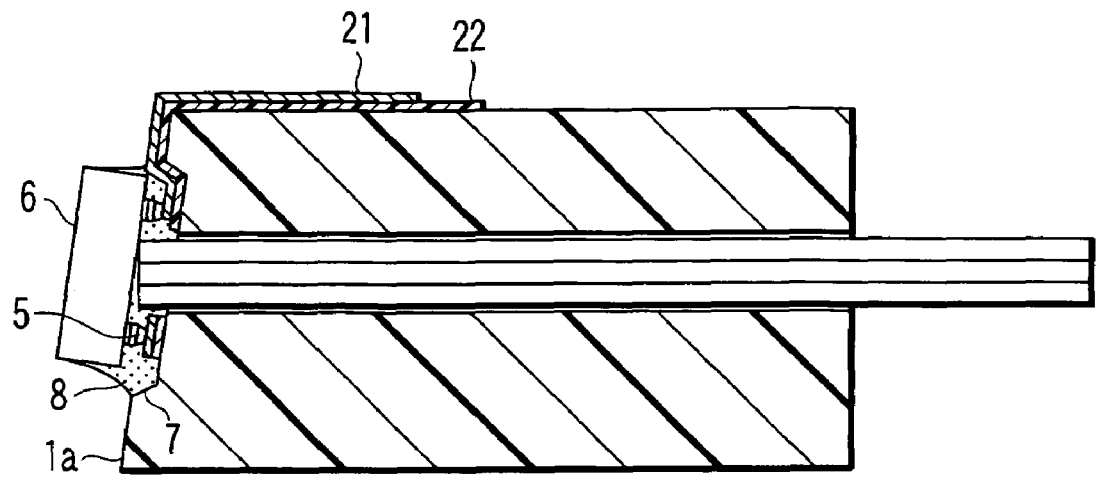
FIG. 7 is a sectional view schematically showing a variation of the optical module shown in FIG. 1.
Figure 8:
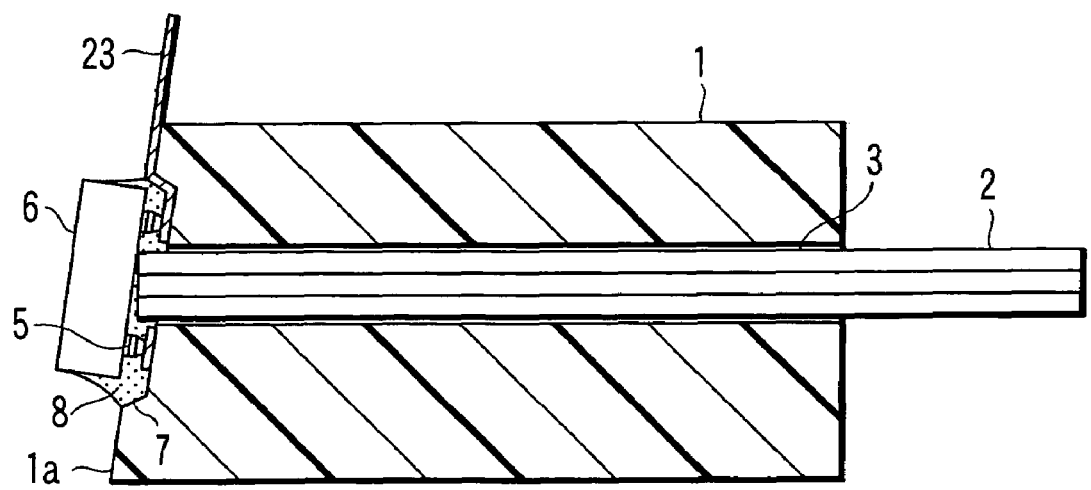
FIG. 8 is a sectional view schematically showing a variation of the optical module shown in FIG. 1.

The electric wiring need not necessarily be formed by plating but may be a TAB tape or a lead frame. FIG. 7 shows an example in which a TAB tape is used as electric wiring. In the optical module shown in FIG. 7, a metal film 21 as electric wiring is bonded to a polyimide tape 22 adhesively fixed to the holding member 1 by a polyimide adhesive. FIG. 8 shows an example in which a lead frame is used as electric wiring. In the optical module shown in FIG. 8, a lead frame 23 is bonded to the device mounting surface 1a of the holding member 1 and to the recess 7. The lead frame 23 is relatively thick and difficult to bend to the shape of the holding member 1. Accordingly, the lead frame 23 may partly project from the holding member 1 as shown in FIG. 8. An Au wire or the like may then be bonded to the projecting portion.

Figure 9:
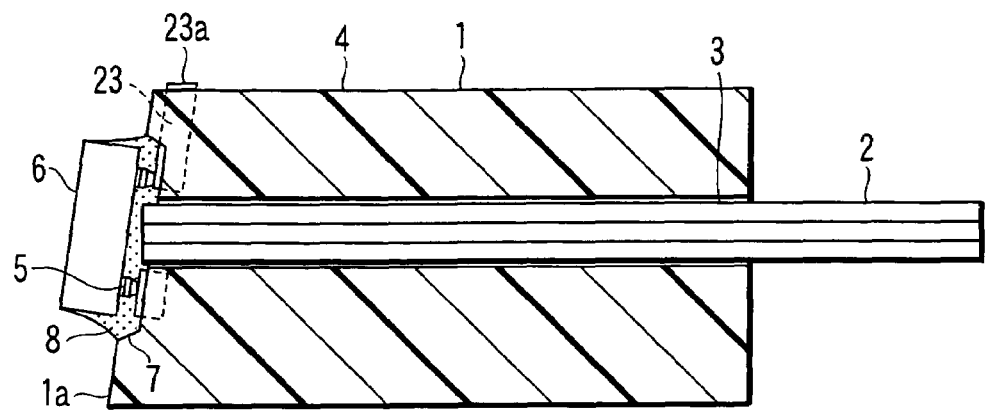
FIG. 9 is a sectional view schematically showing an another variation of the optical module shown in FIG. 1.
Figure 10:
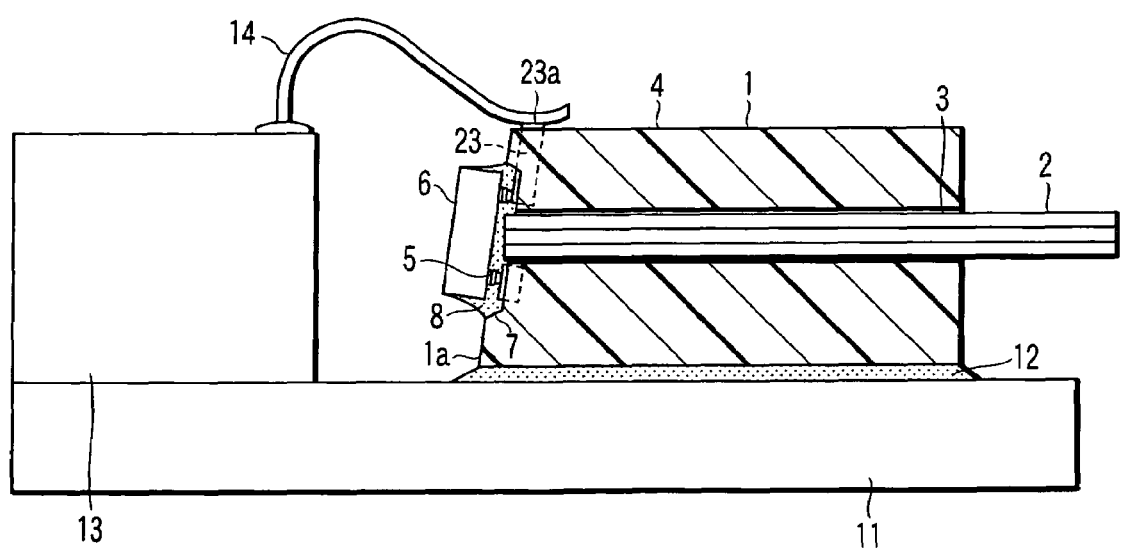
FIG. 10 is a partial sectional view schematically showing how the optical module shown in FIG. 9 is mounted on a mounting substrate.

Moreover, the length over which the lead frame 23 projects from the side surface of the holding member may be minimized so that almost only the cross section 23a in FIG. 9 of the lead is exposed from the side surface of the holding member 1. The cross section 23a can then be used as a bonding area to provide right-angled wiring without the need for folding and can connect with IC on the mounting substrate 11 in FIG. 10. This structure includes few projections and can thus be easily handled during a mounting process. The structure can thus suppress inappropriate bending of the lead. Additionally, when the lead frame 23 is fabricated by insert molding and is exposed only from the bottom surface of the recess and the side surface of the holding member, the edge of the wiring metal can be embedded in the body of the holding member. The structure exerts a higher flowout preventing effect.

In the above various embodiments, the optical module is composed of the optical transmission line and optical semiconductor device integrated with the holding member. However, the embodiment of the present invention is not limited to this arrangement. The holding member may be formed into a unitary product. Further, the optical transmission line need not necessarily be limited to optical fiber but may be an optical waveguide. The material for the optical transmission line holding member may be properly changed in accordance with specifications.

The present invention forms the recess in the optical semiconductor device mounting surface of the holding member. This makes it possible to prevent the low-viscosity adhesive filled between the optical semiconductor device and the optical semiconductor device mounting surface from flowing onto the electric wiring owing to the capillary phenomenon or wettability to contaminate the wiring. The present invention can therefore reduce the possibility of inhibiting the electric contact of the electric wiring. This makes it possible to improve the reliability of the optical semiconductor device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical module comprising:
an optical transmission line having an end face;
a member having a through hole into which the optical transmission line is inserted, a mounting surface and a recess formed in the mounting surface, the recess having a bottom surface in which the through hole is open, the end face of the optical transmission line being exposed in the recess;
electric wirings having connecting portions, which are formed on the bottom surface of the recess and are extended to the outside of the recess;
an optical semiconductor device so arranged in the recess as to be optically coupled with the end face of the optical transmission line with a gap maintained between the optical semiconductor device and the end face, and electrically connected to the connecting portions; and
an adhesive applied to the recess so that the gap is filled with the adhesive and the optical semiconductor device is fixed to the mounting surface.

2. The optical module according to claim 1, wherein the member has a second surface adjacent to the mounting surface and the electric wirings are extended on the mounting surface and the second surface.

3. The optical module according to claim 1, wherein the electric wirings are extended on the mounting surface and projected outside of the mounting surface.

4. The optical module according to claim 2, wherein a direction normal to the mounting surface is inclined to an axial direction of the optical transmission line and the end face of the optical transmission line is substantially perpendicular to the axial direction.

5. The optical module according to claim 3, wherein a direction normal to the mounting surface is inclined to an axial direction of the optical transmission line and the end face of the optical transmission line is substantially perpendicular to the axial direction.

6. The optical module according to claim 2, wherein the adhesive has a refractive index almost equal to a refractive index of the optical transmission line at an operating wavelength of the optical semiconductor device.

7. The optical module according to claim 4, wherein the adhesive has a refractive index almost equal to a refractive index of the optical transmission line at an operating wavelength of the optical semiconductor device.

8. The optical module according to claim 5, wherein the adhesive has a refractive index almost equal to a refractive index of the optical transmission line at an operating wavelength of the optical semiconductor device.

9. The optical module according to claim 1, further comprising a mounting substrate and an IC mounted on the mounting substrate, wherein the member has a third surface fixed to the mounting substrate.

10. The optical module according to claim 9, wherein the third surface is substantially parallel to an axial direction of the optical transmission line.

11. The optical module according to claim 9, wherein the IC is connected to the electric wirings.

12. A holding member comprising:
a body having a through hole in which an optical transmission line having an end face is to be inserted, a mounting surface and a recess formed in the mounting surface, the recess having a bottom surface in which the through hole is open, in which the end face of the optical transmission line is to be exposed, and in which an optical semiconductor device is to be arranged in such a manner that the optical semiconductor device is optically coupled with the end face of the optical transmission line with a gap maintained between the optical semiconductor device and the end face, the optical semiconductor device fixed to the mounting surface; and electric wirings having connecting portions to be connected to the optical semiconductor device, the electric wirings being formed on the bottom surface of the recess and extended to the outside of the recess.

13. The holding member according to claim 12, wherein the member has a second surface adjacent to the mounting surface, and the electric wirings are extended on the mounting surface and the second surface.

14. The holding member according to claim 12, wherein the electric wirings are extended on the mounting surface and projected outside of the mounting surface.

15. The holding member according to claim 12, wherein a direction normal to the mounting surface is inclined to an axial direction of the through hole.

* * * * *